(12) United States Patent
Konishi

(10) Patent No.: US 12,138,533 B2
(45) Date of Patent: *Nov. 12, 2024

(54) INFORMATION PROCESSING APPARATUS, INFORMATION PROCESSING METHOD, AND PROGRAM

(71) Applicant: Sony Interactive Entertainment Inc., Tokyo (JP)

(72) Inventor: Yukari Konishi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 17/918,949

(22) PCT Filed: May 1, 2020

(86) PCT No.: PCT/JP2020/018454
§ 371 (c)(1),
(2) Date: Oct. 14, 2022

(87) PCT Pub. No.: WO2021/220515
PCT Pub. Date: Nov. 4, 2021

(65) Prior Publication Data
US 2023/0233931 A1 Jul. 27, 2023

(51) Int. Cl.
H04B 3/36 (2006.01)
A63F 13/285 (2014.01)
(Continued)

(52) U.S. Cl.
CPC .............. A63F 13/285 (2014.09); G06F 3/16 (2013.01); G08B 6/00 (2013.01)

(58) Field of Classification Search
CPC ...... A63F 13/285; A63F 13/215; A63F 13/67; G06F 3/16; G06F 3/01; G06F 3/165; G08B 6/00; G10L 21/16; G10L 25/30
(Continued)

(56) References Cited

U.S. PATENT DOCUMENTS 8,754,757 B1 * 6/2014 Ullrich ..................... G08B 6/00
340/407.1
9,330,547 B2   5/2016 Saboune
(Continued)

FOREIGN PATENT DOCUMENTS

JP   2019169195 A   10/2019
JP   2020034624 A    3/2020
WO  2019244625 A1  12/2019

OTHER PUBLICATIONS

International Search Report for corresponding PCT Application No. PCT/JP2020/018454, 6 pages, dated Jul. 21, 2020.
(Continued)

Primary Examiner — Tai T Nguyen
(74) Attorney, Agent, or Firm — Matthew B. Dernier, Esq.

(57) ABSTRACT

An information processing apparatus is configured to acquire sound data, acquire, as teacher vibration data, vibration data that is created on the basis of the sound data and that is used to cause a vibration device to vibrate, and execute machine learning by using the sound data and the teacher vibration data, to generate learned model data that is used to convert an input sound waveform into an output vibration waveform. The information processing apparatus executes the machine learning by using a value obtained by analysis of a frequency spectrum of the sound data as an input feature amount.

10 Claims, 5 Drawing Sheets

(51) Int. Cl.
*G06F 3/16* (2006.01)
*G08B 6/00* (2006.01)

(58) Field of Classification Search
USPC ..................................................... 340/407.1
See application file for complete search history.

(56) References Cited

U.S. PATENT DOCUMENTS

| | | | |
|---|---|---|---|
| 9,448,626 B2* | 9/2016 | Cruz-Hernandez | G06F 3/016 |
| 10,691,218 B2* | 6/2020 | Chan | H04R 1/028 |
| 11,282,505 B2 | 3/2022 | Hayakawa | |
| 2015/0339898 A1 | 11/2015 | Saboune | |
| 2016/0027264 A1* | 1/2016 | Choi | G08B 6/00 |
| | | | 340/407.1 |
| 2018/0233163 A1 | 8/2018 | Eagleman | |
| 2018/0301060 A1 | 10/2018 | Israr | |
| 2019/0247010 A1* | 8/2019 | Barnacka | A61B 8/02 |
| 2020/0066260 A1 | 2/2020 | Hayakawa | |
| 2021/0241586 A1 | 8/2021 | Yokoyama | |

OTHER PUBLICATIONS

Yoshida, K. et al., "VibVid: VIBration estimation from VIDeo by using Neural Network" International Conference on Artificial Reality and Telexistence and Eurographics Symposium on Virtual Environments, <URL:https://diglib.eg.org/handle/10.2312/egve20171336>, pp. 37-44, Tokyo, Japan, Nov. 22, 2017 (for relevance, see Non-Pat. Lit. #1).

Shotaro Agatsuma, et al., "GAN: Signal generation for vibrotactile display by generative adversarial network" Proceedings of the 23rd Annual Conference of the Virtual Reality Society of Japan, <URL:http://conference.vrsj.org/ac2018/program2018/pdf/31A-6.pdf>, pp. 1-4, Japan, Sep. 23, 2018 (for relevance, see Non-Pat. Lit. #1).

Notice of Reasons for Refusal for corresponding JP Application No. 2022-518579, 6 pages dated Oct. 6, 2023.

* cited by examiner

INFORMATION PROCESSING APPARATUS, INFORMATION PROCESSING METHOD, AND PROGRAM

TECHNICAL FIELD

The present invention relates to an information processing apparatus, an information processing method, a program, and learned model data that are used to generate a vibration waveform for causing a vibration device to vibrate.

BACKGROUND ART

For example, for the purpose of enhancing the immersive experience in a computer game and so forth, a vibration device that transmits a vibration to a user is used. By causing such a vibration device to operate in a state in which it is held or worn by the user, it is possible to present a vibration to the user.

SUMMARY

Technical Problem

In order to cause a vibration device to operate, vibration waveform data that designates with what waveform an internal vibration mechanism of the vibration device is to actually vibrate is needed. If such vibration waveform data is manually created by a person, it takes time and effort. Therefore, a method of automatically generating vibration waveform data on the basis of the existing sound waveform data has been examined. However, a method of generating vibration waveform data similar to vibration waveform data that is created manually has not sufficiently been examined as yet.

The present invention has been made taking the situation described above into consideration, and one of the objects of the present invention resides in provision of an information processing apparatus, an information processing method, a program, and learned model data with which vibration waveform data similar to vibration waveform data that is created by a person can be generated automatically.

Solution to Problem

According to an aspect of the present invention, there is provided an information processing apparatus including a sound data acquisition section configured to acquire sound data, a teacher vibration data acquisition section configured to acquire, as teacher vibration data, vibration data that is created on the basis of the sound data and that is used to cause a vibration device to vibrate, and a machine learning section configured to execute machine learning by using the sound data and the teacher vibration data, to generate learned model data that is used to convert an input sound waveform into an output vibration waveform. The machine learning section executes the machine learning by using a value obtained by analysis of a frequency spectrum of the sound data, as an input feature amount.

According to another aspect of the present invention, there is provided an information processing method including a sound data acquisition step of acquiring sound data, a teacher vibration data acquisition step of acquiring, as teacher vibration data, vibration data that is created on the basis of the sound data and that is used to cause a vibration device to vibrate, and a machine learning step of executing machine learning by using the sound data and the teacher vibration data, to generate learned model data that is used to convert an input sound waveform into an output vibration waveform. In the machine learning step, the machine learning is executed by using a value obtained by analysis of a frequency spectrum of the sound data as an input feature amount.

According to a further aspect of the present invention, there is provided a program for causing a computer to execute a sound data acquisition step of acquiring sound data, a teacher vibration data acquisition step of acquiring, as teacher vibration data, vibration data that is created on the basis of the sound data and that is used to cause a vibration device to vibrate, and a machine learning step of executing machine learning by using the sound data and the teacher vibration data, to generate learned model data that is used to convert an input sound waveform into an output vibration waveform. In the machine learning step, the machine learning is executed by using a value obtained by analysis of a frequency spectrum of the sound data as an input feature amount. The program may be stored into and provided as a computer-readable non-transitory information storage medium.

According to a still further aspect of the present invention, there is provided learned model data that is used to convert a sound waveform into a vibration waveform. The learned model data is obtained as a result of execution of machine learning in which a value obtained by analysis of a frequency spectrum of sound data is used as an input feature amount and in which teacher vibration data as information related to vibration data that is created on the basis of the sound data and that is used to cause a vibration device to vibrate is used as teacher data. This data may be stored into and provided as a computer-readable non-transitory information storage medium.

According to a yet further aspect of the present invention, there is provided an information processing apparatus including a target sound data acquisition section configured to acquire target sound data to be processed, and a vibration data generation section configured to convert the target sound data into a vibration waveform to generate vibration data for causing a vibration device to vibrate, by using learned model data that is used to convert a sound waveform into a vibration waveform. The learned model data is obtained as a result of execution of machine learning in which a value obtained by analysis of a frequency spectrum of sound data is used as an input feature amount and in which teacher vibration data as information related to the vibration data that is created on the basis of the sound data and that is used to cause the vibration device to vibrate is used as teacher data.

DESCRIPTION OF EMBODIMENT

In the following, an embodiment of the present invention is described in detail with reference to the drawings.

Figure 1:
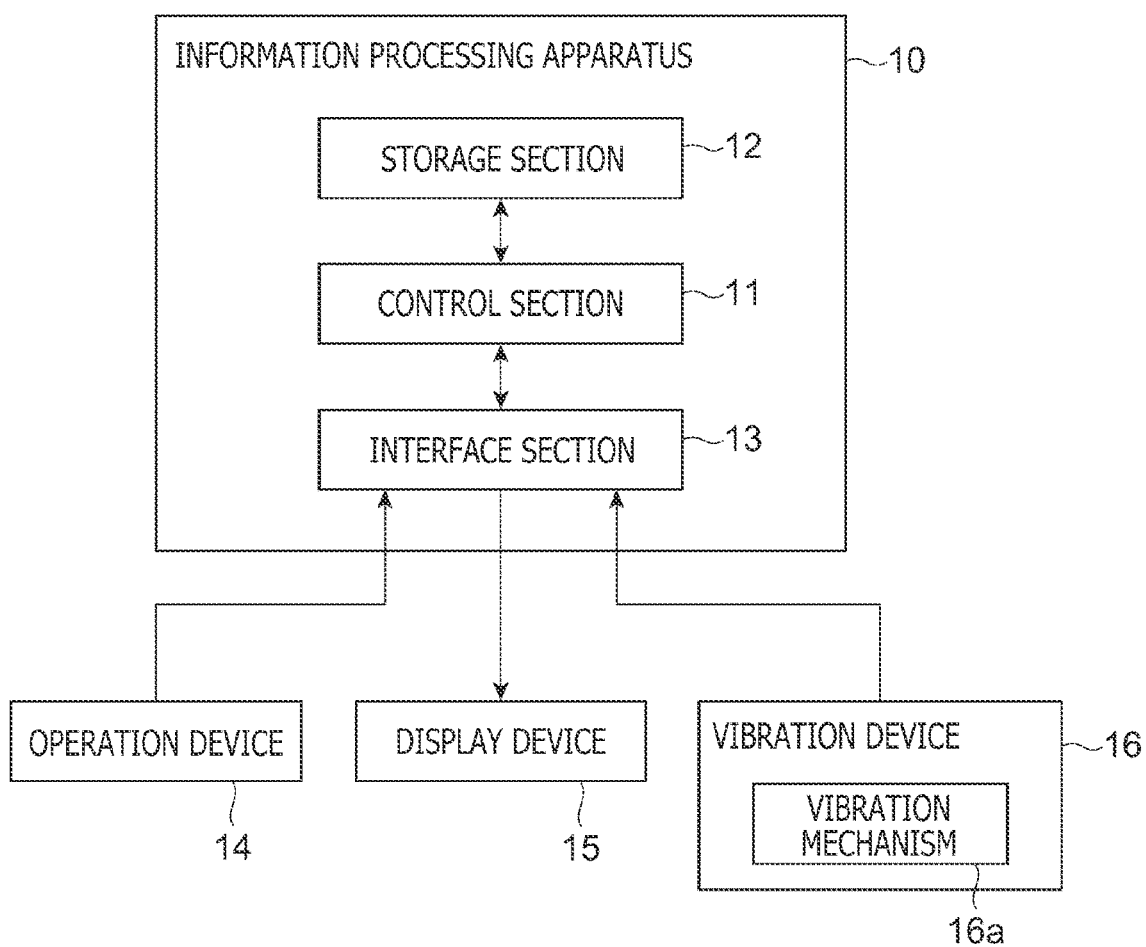
FIG. 1 is a configuration block diagram of an information processing system including an information processing apparatus that is an information processing apparatus according to an embodiment of the present invention.

FIG. 1 is a configuration block diagram of an information processing apparatus 10 according to an embodiment of the present invention. The information processing apparatus 10 is such an information processing apparatus as a personal computer and includes a control section 11, a storage section 12, and an interface section 13 as depicted in FIG. 1. Further, the information processing apparatus 10 is connected to an operation device 14, a display device 15, and a vibration device 16.

The control section 11 includes at least one processor such as a CPU (Central Processing Unit) and executes a program stored in the storage section 12, to execute various types of information processing. It is to be noted that a particular example of processing executed by the control section 11 in the present embodiment is described later. The storage section 12 includes at least one memory device such as a RAM (Random-Access Memory) and stores a program to be executed by the control section 11 and data to be processed by the program.

The interface section 13 is an interface for data communication with the operation device 14, the display device 15, and the vibration device 16. The information processing apparatus 10 is connected to each of the operation device 14, the display device 15, and the vibration device 16 via the interface section 13 in either a wired or wireless manner. In particular, the interface section 13 includes a multimedia interface for transmitting, to the display device 15, image data supplied from the information processing apparatus 10. Further, the interface section 13 includes a data communication interface such as a USB (Universal Serial Bus) interface in order to receive an operation signal indicative of the details of an operation made by a user and accepted by the operation device 14 and to transmit a control signal for causing the vibration device 16 to vibrate.

The operation device 14 is a device that accepts an operation instruction from a user and that transmits an operation signal indicative of the details of the operation instruction to the information processing apparatus 10. The operation device 14 may include, for example, a keyboard, a mouse, and so forth. The display device 15 displays an image according to an image signal transmitted thereto from the information processing apparatus 10, to allow the user to view the image.

The vibration device 16 is a device that is used to present a vibration to a user. The vibration device 16 has a vibration mechanism 16a built therein and causes the vibration mechanism 16a to vibrate according to a control signal received from the information processing apparatus 10. Consequently, the vibration is presented to a user who holds the vibration device 16. The vibration mechanism 16a may be any mechanism that can generate a vibration by any of various methods such as an eccentric motor (ERM (Eccentric Rotating Mass)), a voice coil motor, a linear resonance actuator, or a piezoelectric actuator. Further, the vibration device 16 may have a plurality of vibration mechanisms 16a built therein.

Figure 2:
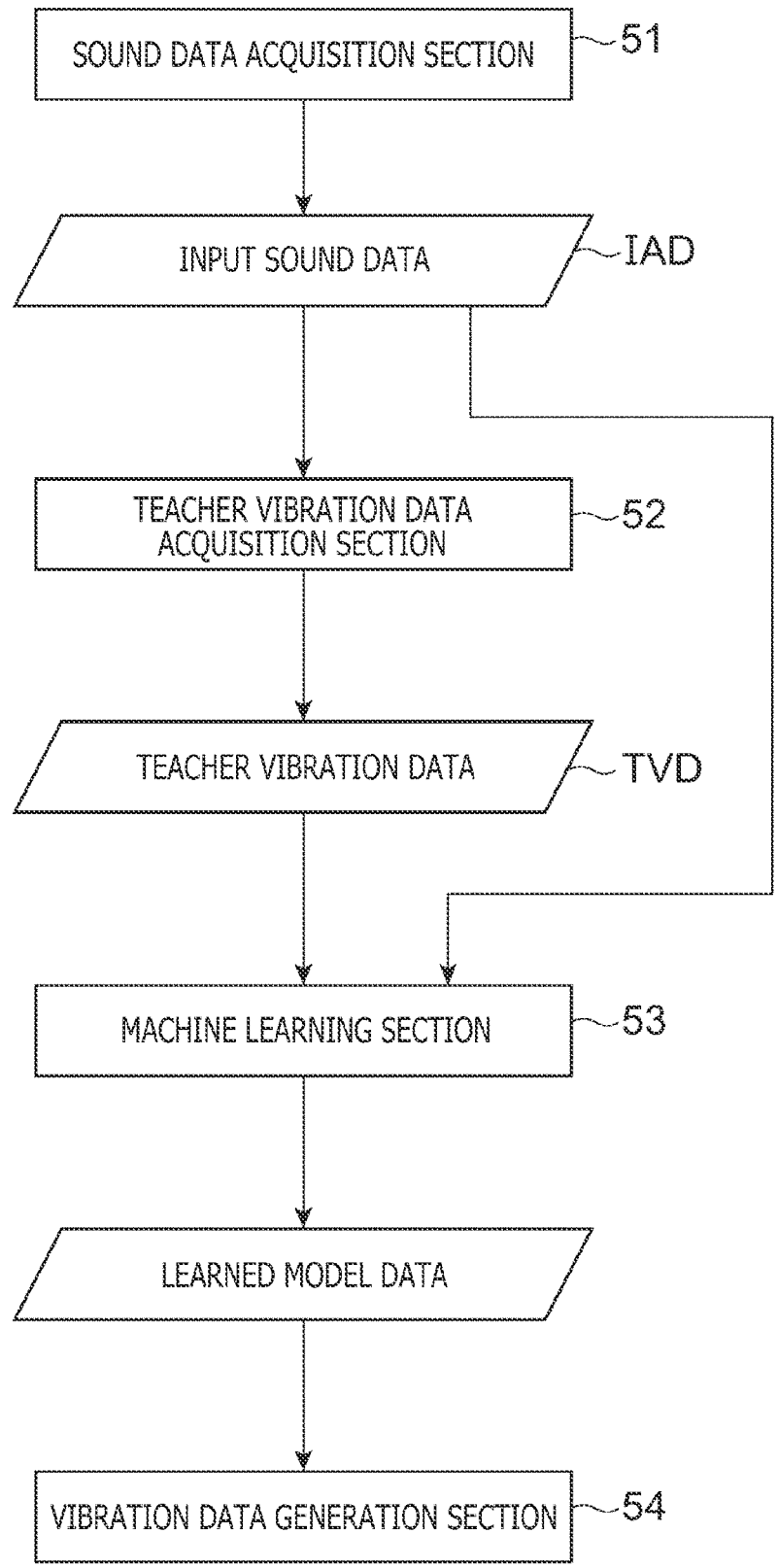
FIG. 2 is a functional block diagram of the information processing apparatus.

Now, functions implemented by the information processing apparatus 10 are described with reference to FIG. 2. The information processing apparatus 10 is used to generate vibration waveform data on the basis of sound data. As depicted in FIG. 2, the information processing apparatus 10 functionally includes a sound data acquisition section 51, a teacher vibration data acquisition section 52, a machine learning section 53, and a vibration data generation section 54. These functions are implemented by the control section 11 executing a program stored in the storage section 12. This program may be provided to the information processing apparatus 10 through a communication network such as the Internet or may be stored into and provided as a computer-readable information storage medium such as an optical disk.

The sound data acquisition section 51 acquires sound data that is original data for generating vibration data. In the following description, sound data acquired by the sound data acquisition section 51 is represented as input sound data IAD. The input sound data IAD is data representing a waveform of a sound. Typically, in a case where a vibration is presented to a user, such a sound including sound effects is reproduced at the same timing. Therefore, by using, as original data, the input sound data IAD that represents a waveform of such a sound that is reproduced together with a vibration, vibration data can be generated efficiently.

The sound data acquisition section 51 acquires a plurality of pieces of sound data to use them as sample data (input data) in machine learning to be described later. It is to be noted that, in order to increase the number of pieces of sample data (data augmentation), the sound data acquisition section 51 may otherwise acquire data that is obtained by application of such sound signal processing as pitch shift, time shift, normalization, and equalization to one piece of input sound data IAD inputted from the outside, as other input sound data IAD.

The teacher vibration data acquisition section 52 acquires teacher vibration data TVD that is to be used as teacher data in machine learning to be described later. The teacher vibration data TVD is data indicating a vibration waveform for causing the vibration mechanism 16a to vibrate. In particular, the teacher vibration data acquisition section 52 acquires, for each of a plurality of pieces of input sound data IAD acquired as sample data, teacher vibration data TVD created by using the input sound data IAD as original data. That is, the teacher vibration data TVD is generated when various types of processing are performed on a sound waveform included in the input sound data IAD acquired by the sound data acquisition section 51. In a case of generating vibration data on the basis of the waveform of the input sound data IAD, a vibration waveform associated with a sound can be generated easily in comparison with a case of generating a waveform of a vibration from the beginning. Consequently, a plurality of sets of sound data and teacher vibration data are obtained.

The details of processing performed when teacher vibration data TVD is to be generated, such as a type of processing and numerical values of parameters to be used for the processing, are manually designated by a creator who creates vibration data. For example, the creator causes the vibration device 16 to vibrate on the basis of actual vibration data that has been subjected to the processing, and adjusts the details of the processing by, for example, experiencing the vibration from the vibration device 16, to generate desired vibration data.

In particular, for example, the teacher vibration data acquisition section 52 applies various types of filter processing such as low-pass filter processing for removing high frequency components, to the sound data, according to an instruction inputted by the creator using the operation device 14. Since it is generally difficult for the vibration device 16 to generate a vibration of high frequencies, the low-pass filter processing is applied to the input sound data IAD to remove high frequency components thereof. Further, the teacher vibration data acquisition section 52 may perform, on the input sound data IAD, processing of a type similar to various types of signal processing that can be applied to sound data, such as pitch shift processing and equalization processing. In addition, the teacher vibration data acquisition section 52 may perform processing for changing the envelope shape or processing for adding a given waveform (pulse wave or the like).

Moreover, it is common for the creator to apply a different type of processing to data depending upon a type (category) of a vibration that the creator intends to generate. For example, in a case of generating a vibration when a character in a game performs such an action as hitting or stabbing an enemy with a weapon, it is desirable to generate an especially strong vibration at a timing immediately after the generation of the vibration. Further, it is assumed that a vibration generated in a case where a game character touches an object indicates a different tendency depending upon the material of the object that the game character touches, such as metal, rubber, or wood. In such a manner, the creator changes the type of filter to be applied, according to the type of vibration that the creator intends to generate, or changes the details of the processing, for example, for each of time segments during a period of time from the start of the vibration to the end of the vibration or for each of the frequencies, to thereby create vibration data.

It is to be noted that the teacher vibration data acquisition section 52 may acquire information indicative of a type of vibration, together with the teacher vibration data TVD. In the following description, information indicative of a type of vibration is referred to as category information. The category information may be information that is designated by a creator who has created the teacher vibration data TVD.

Further, depending upon a type of vibration that the creator intends to generate, the creator may replace the vibration waveform itself with a different waveform. For example, in a case where an attempt is made to reproduce a vibration that occurs when metal pieces are brought into contact with each other, the vibration waveform is replaced with a sine wave of a specific frequency or the like. In this case, although the teacher vibration data TVD has a waveform conforming to that of the original sound data in regard to the length (generation period), the envelope, and so forth of the vibration, the waveform shape of the teacher vibration data TVD becomes different from that of the original input sound data IAD.

The machine learning section 53 performs machine learning by using, as teacher data, a set of teacher vibration data acquired by the teacher vibration data acquisition section 52 and sound data used as the original data when the teacher vibration data is generated. A learned model built by this machine learning is a conversion model for generating vibration data on the basis of the sound data, and is preferably a conversion model that outputs, in a case where sound data similar to the input sound data IAD is inputted thereto, vibration data similar to the teacher vibration data TVD created by the creator on the basis of the input sound data IAD.

Here, an algorithm of the machine learning executed by the machine learning section 53 may be any of various algorithms such as a deep learning algorithm using a neural network, for example. More specifically, the machine learning section 53 may use an algorithm of a CNN (Convolution Neural Network), a BiRNN (Bidirectional Recurrent Neural Network), or the like and may use a plurality of different algorithms in combination. Further, the machine learning section 53 executes the machine learning by using, as an input feature amount, a value obtained by analysis of at least a frequency spectrum of a sound waveform included in the input sound data IAD.

Figure 3:
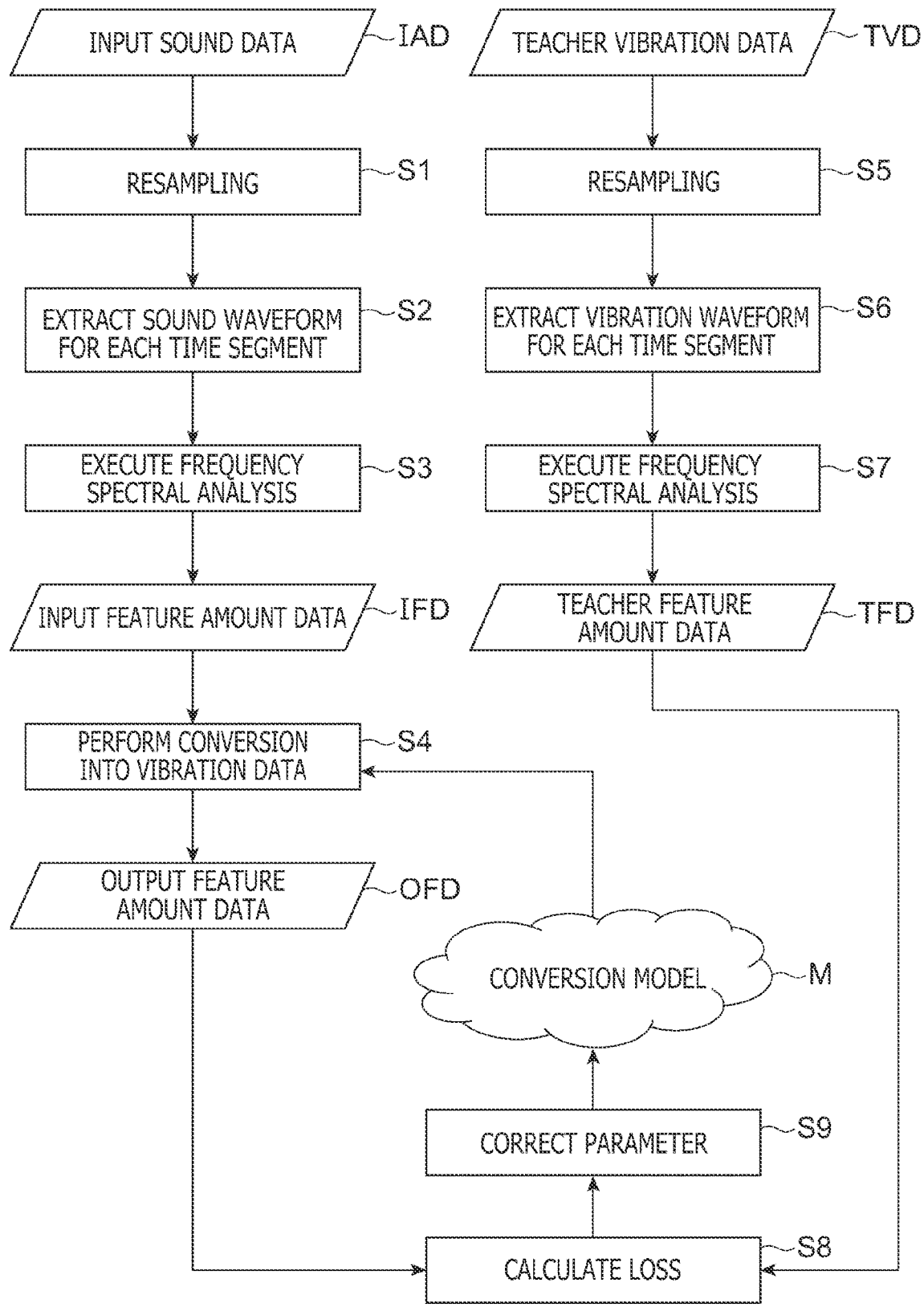
FIG. 3 is a data flow chart illustrating an example of a machine learning process.

In the following, a particular example of a process executed by the machine learning section 53 is described with reference to a data flow chart of FIG. 3. In FIG. 3, a flow of a process executed on one piece of input sound data IAD acquired by the sound data acquisition section 51 and teacher vibration data TVD generated on the basis of the input sound data IAD is depicted.

First, the machine learning section 53 executes resampling of a sound waveform as preprocessing for the input sound data IAD (S1). The machine learning section 53 may additionally execute such processing as zero padding to add zeros to the beginning or end of the waveform. Then, the machine learning section 53 extracts a sound waveform for each of time segments (time windows) from the input sound data IAD (S2). The time segments each have a predetermined length and are arranged at fixed intervals in chronological order. Here, each time segment may partly overlap with an adjacent one of the time segments.

Thereafter, the machine learning section 53 analyzes the extracted sound waveforms in the respective time segments to generate input feature amount data IFD to be inputted to a machine learning model (S3). The input feature amount data IFD is a set of parameters that are generated on the basis of the input sound data IAD and that indicate features of the waveform of the input sound data IAD.

In particular, the machine learning section 53 executes frequency spectral analysis on the sound waveform for each time segment to calculate component values of the plurality of frequencies. Although various techniques such as a DCT (Discrete Cosine Transform) and an FFT (Fast Fourier Transform) are available for analyzing frequencies, it is especially preferable to use the FFT. In a case where such a transform is to be performed, before the transform is performed, a window function such as the Hann window may be applied to the waveform data. Further, each of the feature amounts included in the input feature amount data IFD may be a value itself obtained as a result of the FFT or the like or may otherwise be a numerical value representing the magnitude of an amplitude component obtained by converting the resultant value. In addition, the numerical value representing the magnitude of an amplitude component may be a value represented by a level using the decibel or the like as a unit. The value of the amplitude component obtained for each frequency in this manner forms an amplitude spectrogram.

The input feature amount data IFD may include, in addition to such a value of an amplitude component as described above, a value relating to a phase component of the sound waveform, as some of the input feature amounts. The value of a phase component is obtained by executing frequency spectral analysis on a sound waveform for each time segment, similarly to the value of an amplitude component. However, since the waveform to be analyzed is a waveform extracted from the original sound waveform by a time segment, the values of phase components differ depending upon a position where the waveform is extracted. Therefore, the machine learning section 53 may use, not the value of a phase component itself obtained by analysis of the frequency spectrum, but a value that indicates an amount of change in the value of the phase component with respect to the value of a phase component of the preceding and adjacent time segment, as an input feature amount to be included into the input feature amount data IFD.

As a particular example, it is assumed that, from a sound waveform corresponding to each of n time segments, amplitude component values and phase component values of m frequencies are calculated. In this case, n×m input feature amounts are calculated for the amplitude components, and n×m input feature amounts are calculated also for the phase components. The input feature amount data IFD is data that includes the n×m×2 input feature amounts as components thereof. Among them, an input feature amount of a phase component of each frequency in the i-th time segment is a value indicative of an amount of change from a phase component of the same frequency in the (i−1)-th time segment to the phase component in the i-th time segment.

It is to be noted that, depending upon the configuration of a conversion model M, the number n of time segments that configure an input feature amount may not be a fixed value and may be a value that changes according to the waveform length of the input sound data IAD (that is, a length of time of a sound). By adopting such a conversion model M, various pieces of sound data having different waveform lengths can be used as the input sound data IAD.

The machine learning section 53 inputs, to a given conversion model M, the input feature amount data IFD obtained by the preprocessing of S1 to S3 described above, to perform conversion into vibration data (S4). This conversion model M is decided by an adopted machine learning algorithm and includes a plurality of conversion parameters. For example, in a neural network model including a plurality of layers, a weight coefficient of each layer and so forth are the conversion parameters.

In the following description, output data obtained by the conversion in S4 is referred to as output feature amount data OFD. The output feature amount data OFD includes a plurality of output feature amounts and is used to generate vibration waveform data (hereinafter referred to as output vibration data OVD) to be compared with the teacher vibration data TVD.

The output feature amounts included in the output feature amount data OFD may represent, for example, an amplitude component and a phase component of each frequency in a time segment (that is, spectrogram of the vibration waveform), similarly to the input feature amounts. In this case, the number of the output feature amounts is n×m×2 similarly to the number of the input feature amounts, and the vibration waveform of the output vibration data OVD can be obtained from the output feature amounts according to a procedure that is opposite to the procedure for calculating the input feature amount data IFD from the input sound data IAD. It is to be noted that the phase components of the vibration waveform may automatically be decided by a given algorithm without using the output feature amounts.

Further, the output feature amount data OFD may not be data that configures the spectrogram itself of a vibration waveform, and may be data that includes a plurality of types of parameters indicating the details of the operation performed on the spectrogram of the original sound waveform.

As a particular example, the output feature amount data OFD may include four types of parameter arrays γ, α, add1, and add2. In this example, from among the four types of parameter arrays, γ and α each include n parameters corresponding to n time segments, while add1 and add2 each include n×m feature amounts corresponding to n time segments and m frequencies. In other words, γ and α are parameters indicating the details of an operation that is common to all of the plurality of frequencies (do not rely upon the frequency), while add1 and add2 are parameters indicating the details of operations that are individually applied to the plurality of frequencies. By applying the operation using such parameters as described above to an amplitude spectrogram of the original sound waveform, a vibration waveform can be generated. In particular, if the amplitude spectrogram of a waveform where a low-pass filter for removing components of a predetermined frequency or more is applied to the sound waveform of the input sound data IAD is represented as LPF(IAD), then the amplitude spectrogram of the output vibration data OVD is decided by the following expression.

$$OVD=\gamma \times (\alpha \times add1 + (1-\alpha) \times LPF(IAD) + add2)$$

By using γ, α, add1, and add2 in this manner, the output vibration data OVD can be generated.

In a case where a creator manually creates teacher vibration data TVD from input sound data IAD, processing for increasing or attenuating the amplitude of the entire waveform is sometimes carried out, regardless of the frequency. Also, there is a case in which equalization processing for increasing or reducing a vibration of a specific frequency, processing for adding a pulse waveform of a specific frequency, or other processing is carried out. By using an output feature amount including both a parameter common to frequencies and a parameter for each of the frequencies, it is possible to create a learned model with which a process of creating vibration data by a creator, the process including processing that does not rely upon a frequency and processing that is performed for each frequency, can be estimated with a higher degree of accuracy.

While a spectrogram of the output vibration data OVD is generated in such a manner as described above, the machine learning section 53 also applies, to the teacher vibration data TVD corresponding to the input sound data IAD, processing (S5 to S7) similar to the preprocessing (S1 to S3) performed on the input sound data IAD, to generate a spectrogram indicating features of the vibration waveform. In the following, data regarding a spectrogram obtained by analysis of the frequency spectrum of the teacher vibration data is referred to as teacher feature amount data TFD. It is to be noted that, since the teacher vibration data TVD is vibration data from which high frequency components have been removed, amplitude components of frequencies of the teacher feature amount data TFD that are equal to or higher than the predetermined threshold value should have values close to zero amplitude.

Next, the machine learning section 53 calculates an index value (loss) for evaluating the difference between the spectrogram of the output vibration data OVD, which is obtained by the processing described above, and the teacher feature amount data TFD (S8). Then, the machine learning section 53 corrects the value of a parameter included in the conversion model M such that the calculated value of the loss decreases (S9). It is to be noted that the loss used here may be any of various index values such as a mean square error of the corresponding feature amounts.

The machine learning section 53 repeats such a process of machine learning as described above by using a plurality of sets of input sound data IAD and teacher vibration data TVD. This makes it possible to generate a conversion model M with which output vibration data OVD similar to a waveform of teacher vibration data TVD that is manually created by a creator can be obtained. A conversion model M that is obtained as a result of machine learning in which a sufficient number of pieces of sample data are used in this manner is referred to as a learned model. Further, a set of parameters included in the learned model is referred to as learned model data.

Figure 4:
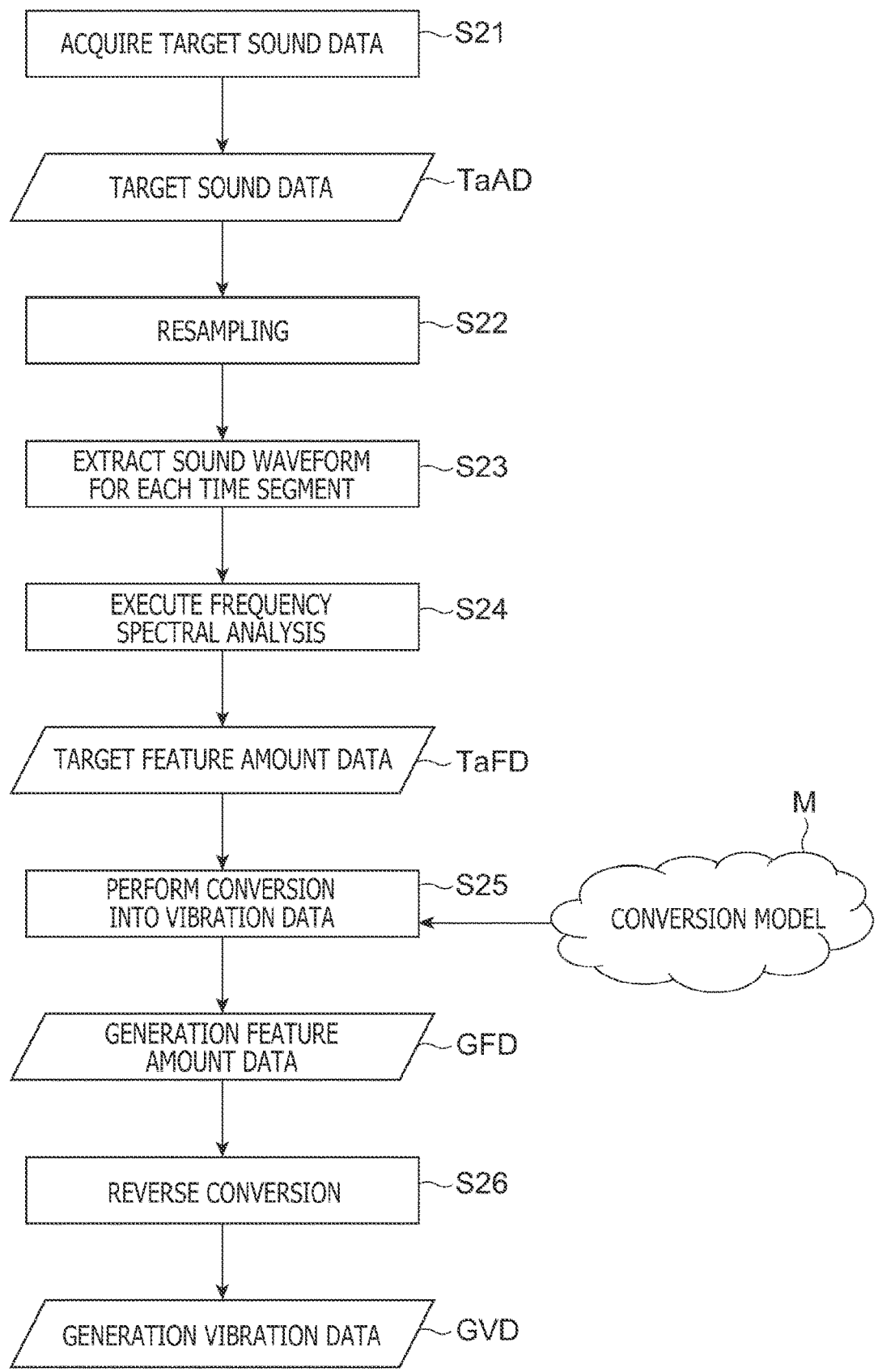
FIG. 4 is a data flow chart illustrating an example of a vibration data generation process.

The vibration data generation section 54 generates new vibration data by using the learned model data generated by the machine learning section 53. In the following, a particular example of a process executed by the vibration data generation section 54 is described with reference to a data flow chart of FIG. 4.

First, the vibration data generation section 54 newly acquires sound data (hereinafter referred to as target sound data TaAD) different from the sample data used in machine learning (S21). Then, the vibration data generation section 54 executes preprocessing (S22 to S24) similar to the preprocessing (S1 to S3) performed in the machine learning, on the target sound data TaAD, to calculate feature amount data (hereinafter referred to as target feature amount data TaFD) indicative of features of the waveform of the target sound data TaAD.

The vibration data generation section 54 inputs the target feature amount data TaFD to the learned model generated by the machine learning section 53, to calculate feature amount data indicating a new vibration waveform (S25). In the following description, the converted data that is obtained by inputting the target feature amount data TaFD is referred to as generation feature amount data GFD. Further, the vibration data generation section 54 uses the generation feature amount data GFD to generate waveform data indicating a vibration waveform corresponding to the target sound data TaAD (S26). In particular, for example, in a case where the FFT is executed in the preprocessing to convert waveform data into frequency components, waveform data can be generated for each time segment by applying an inverse Fourier transform to the generation feature amount data GFD. By generating such waveform data for all time segments and coupling them together, waveform data of a time length corresponding to the target sound data TaAD is obtained. Data of a vibration waveform obtained on the basis of the generation feature amount data GFD is hereinafter referred to as generation vibration data GVD.

Further, in a case where the output feature amount data OFD includes a plurality of types of parameter arrays as described above, the generation feature amount data GFD also includes parameter arrays having a similar configuration. In this case, the vibration data generation section 54 generates generation vibration data GVD on the basis of a spectrogram of the target sound data TaAD by using such parameter arrays.

It is to be noted that, prior to the processing in S26, processing for reducing components of a specific frequency band may be executed on the generation feature amount data GFD obtained in S25. As described above, even if the generation vibration data GVD includes components of high frequencies, it is difficult to cause the vibration device 16 to generate a vibration of such high frequencies. Therefore, by reducing in advance the values of the feature amounts of high frequency components included in the generation feature amount data GFD, generation vibration data GVD that does not include a vibration of the high frequencies can be generated. In particular, for a feature amount of a frequency band equal to or higher than a predetermined threshold value (for example, 500 Hz) included in the generation feature amount data GFD obtained in S25, for example, the vibration data generation section 54 replaces the value of the feature amount indicating the amplitude of the component of the frequency, with a value close to zero (for example, −90 dB).

As described above, by using the learned model data generated by the machine learning section 53, the vibration data generation section 54 can automatically generate new generation vibration data GVD from the target sound data TaAD without the necessity for a work by a creator.

While it has been described in the foregoing description that the machine learning section 53 compares the spectrogram of the output vibration data OVD and the teacher feature amount data TFD directly with each other to perform machine learning, the way of performing machine learning is not limited to this, and the machine learning section 53 may perform machine learning by various methods.

In particular, for example, the machine learning section 53 may use a technique of GANs (Generative Adversarial Networks) as the machine learning algorithm. In this example, in addition to the abovementioned conversion model M for generating a vibration waveform (the conversion model M corresponds to a generator in the GAN), a classifier (discriminator) that identifies whether a waveform has been generated by a generator or has been created manually by a person is prepared such that the generator and the discriminator learn in parallel. With this, as the learning proceeds, the generator becomes able to generate a vibration waveform that cannot be identified by the discriminator (that is, that cannot be distinguished from teacher data). In the present embodiment, it is an object to generate, by machine learning, vibration data that has features similar to those of vibration data created manually by a person. Therefore, by applying the technique of the GAN, it becomes possible to generate vibration data that is hard to distinguish from the genuine data (vibration data that is manually created by a person).

Further, in this case, the discriminator may not only identify whether the received vibration waveform is true or false (whether the vibration waveform has been created manually by a person or has been outputted from the generator) but also determine a type (category) of the vibration waveform. In this example, not only the input sound data IAD but also category information designated by a creator on teacher vibration data TVD generated from the input sound data IAD are inputted to the generator. Then, the discriminator estimates a type of the output vibration data OVD outputted from the generator and outputs a result of the estimation as category information. The machine learning section 53 corrects parameters of the machine learning model included in the generator and the discriminator such that the result of the estimation coincides with the category information designated together with the teacher vibration data TVD, and then performs machine learning. By performing machine learning that improves the identification accuracy of the category in this manner, it becomes possible for the generator to generate output vibration data OVD that reflects features of each category.

Figure 5:
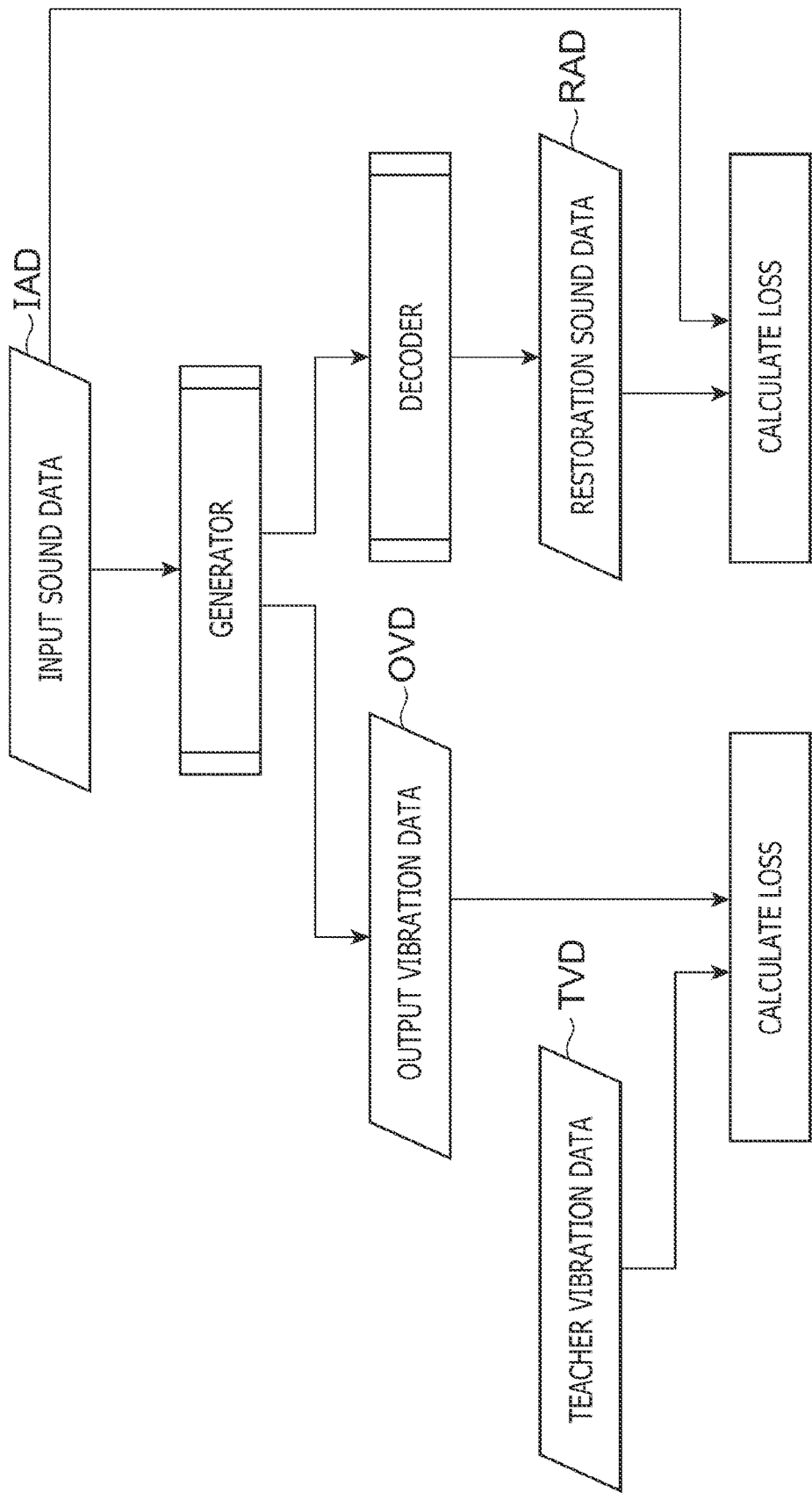
FIG. 5 is a data flow chart depicting an example of an algorithm that is executed by a machine learning section.

Further, the machine learning section 53 may perform evaluation of the loss by using an algorithm similar to an auto encoder. FIG. 5 is a data flow chart depicting an example of an algorithm executed by the machine learning section 53 in this example. In this example, the flow branches at the conversion model M (here, referred to as a generator) that generates output vibration data OVD on the basis of the input sound data IAD, and the conversion model M generates input data (intermediate data) for a decoder. The decoder outputs output feature amounts to be used for generation of a sound waveform, on the basis of the intermediate data received from the generator. Parameters of the machine learning model included in the generator and the decoder are corrected such that sound waveform data (here, referred to as restoration sound data RAD) generated from the output of the decoder coincides with the original input sound data IAD, and machine learning is performed with use of the corrected parameters. In such a manner, after input sound data is converted with use of a conversion model M for generating a vibration waveform, machine learning is performed with use of a learning model for restoring the original sound waveform by the decoder. Thus, such learning that the conversion model M performs conversion in such a manner as to maintain features of the original input sound data IAD can be performed.

Such machine learning that restores an original sound waveform can be executed in parallel with machine learning for generating a vibration waveform by using a conversion model M. As an example, the machine learning section 53 alternately executes different kinds of machine learning on the same conversion model M as follows. First, the machine learning section 53 executes machine learning for adjusting parameters of the conversion model M by using a predetermined number of sets of input sound data IAD and teacher vibration data TVD, and then executes machine learning for restoring the original input sound data IAD by using other input sound data IAD as a predetermined number of pieces of sample data. Here, since the machine learning using the generator and the decoder performs evaluation of loss by comparing the original input sound data IAD and the sound data outputted from the decoder, the input sound data IAD that does not have corresponding teacher vibration data TVD can be used as sample data. Therefore, by executing such a plurality of kinds of machine learning in parallel on the same conversion model M, it is possible to increase the number of pieces of sample data that can be used for learning, to thereby progress learning efficiently.

As described above, with the information processing apparatus 10 according to the present embodiment, it is possible to automatically generate vibration data by using sound data and teacher data that is manually created by a creator.

It is to be noted that the embodiment of the present invention is not limited to that described above. For example, while it has been described in the foregoing description that the single information processing apparatus 10 carries out both a machine learning process and a generation process of vibration data in which learned model data is used, the details are not limited thereto, and the abovementioned processes may individually be performed by different information processing apparatuses. In this case, the information processing apparatus that has performed machine learning stores learned model data obtained as a result of the machine learning into a computer-readable information storage medium or distributes the learned model data through a communication network, and thus provides the learned model data to an external information processing apparatus. The information processing apparatus that receives the learned model data provided thereto can use the provided learned model data to implement such functions of the vibration data generation section 54 as described above.

Also, the details of the machine learning executed by the machine learning section 53 are not limited to those described above. In particular, the type or format of data that is inputted to or outputted from the conversion model M when the machine learning section 53 performs machine learning may be different from those described above. In addition, the machine learning algorithm itself (configuration of the conversion model M) may be different from that described above. It is to be noted that the information processing apparatus 10 may execute some of machine learning algorithms and the techniques of loss evaluation described above in combination.

REFERENCE SIGNS LIST

10: Information processing apparatus
11: Control section
12: Storage section
13: Interface section
14: Operation device
15: Display device
16: Vibration device
51: Sound data acquisition section
52: Teacher vibration data acquisition section
53: Machine learning section
54: Vibration data generation section

The invention claimed is:

1. An information processing apparatus comprising:
   a sound data acquisition section configured to acquire sound data;
   a teacher vibration data acquisition section configured to acquire, as teacher vibration data, vibration data that is created on a basis of the sound data and that is used to cause a vibration device to vibrate; and
   a machine learning section configured to execute machine learning by using the sound data and the teacher vibration data, to generate learned model data that is used to convert an input sound waveform into an output vibration waveform, wherein
   the machine learning section executes the machine learning by using a value obtained by analysis of a frequency spectrum of the sound data, as an input feature amount.

2. The information processing apparatus according to claim 1, wherein the machine learning section executes the machine learning by using not only a value relating to an amplitude component of the frequency spectrum as the input feature amount but also a value relating to a phase component of the frequency spectrum as an input feature amount.

3. The information processing apparatus according to claim 2, wherein
   the machine learning section calculates the input feature amount for each of a plurality of time segments that are arranged in chronological order; and
   the value relating to the phase component is a value indicating an amount of change in the phase component with respect to a value of a phase component in an adjacent time segment.

4. The information processing apparatus according to claim 1, wherein the machine learning section outputs, as output feature amounts in the machine learning, a value of a parameter that is applied to each of a plurality of frequencies obtained by analysis of a frequency spectrum of the input sound waveform and a value of a parameter that is common to all of the plurality of frequencies, the parameter being for converting each of component values of the plurality of frequencies into a corresponding component value of the output vibration waveform.

5. The information processing apparatus according to claim 1, wherein the machine learning section accepts, together with the teacher vibration data, category information that indicates a type of a vibration represented by the teacher vibration data, as teacher data, and performs the machine learning such that a result of estimation of the category information from the output vibration waveform coincides with the category information designated as the teacher data.

6. The information processing apparatus according to claim 1, wherein the machine learning section generates the learned model data by using a conversion model that is a target of the machine learning to execute machine learning in such a manner that, after the input sound waveform is converted, an original sound waveform is restored.

7. An information processing method comprising:
   acquiring sound data;

acquiring, as teacher vibration data, vibration data that is created on a basis of the sound data and that is used to cause a vibration device to vibrate; and executing machine learning by using the sound data and the teacher vibration data, to generate learned model data that is used to convert an input sound waveform into an output vibration waveform, wherein, the executing machine learning is executed with use of a value obtained by analysis of a frequency spectrum of the sound data as an input feature amount.

8. A non-transitory, computer readable storage medium containing a computer program, which when executed by a computer, causes the computer to perform an information processing method by carrying out actions, comprising:

acquiring sound data;

acquiring, as teacher vibration data, vibration data that is created on a basis of the sound data and that is used to cause a vibration device to vibrate; and executing machine learning by using the sound data and the teacher vibration data, to generate learned model data that is used to convert an input sound waveform into an output vibration waveform, wherein, the executing machine learning is executed by using a value obtained by analysis of a frequency spectrum of the sound data as an input feature amount.

9. A non-transitory, computer readable storage medium containing learned model data that is used to convert a sound waveform into a vibration waveform, the learned model data being obtained as a result of execution of machine learning in which a value obtained by analysis of a frequency spectrum of sound data is used as an input feature amount and in which teacher vibration data as information related to vibration data that is created on a basis of the sound data and that is used to cause a vibration device to vibrate is used as teacher data.

10. An information processing apparatus comprising:

a target sound data acquisition section configured to acquire target sound data to be processed; and a vibration data generation section configured to convert the target sound data into a vibration waveform to generate vibration data for causing a vibration device to vibrate, by using learned model data that is used to convert a sound waveform into a vibration waveform, the learned model data being obtained as a result of execution of machine learning in which a value obtained by analysis of a frequency spectrum of sound data is used as an input feature amount and in which teacher vibration data as information related to the vibration data that is created on a basis of the sound data and that is used to cause the vibration device to vibrate is used as teacher data.

* * * * *